(No Model.)
E. B. BARKER.
ADJUSTABLE PLATE HOLDER FOR PHOTOGRAPHIC CAMERAS.
No. 356,567. Patented Jan. 25, 1887.
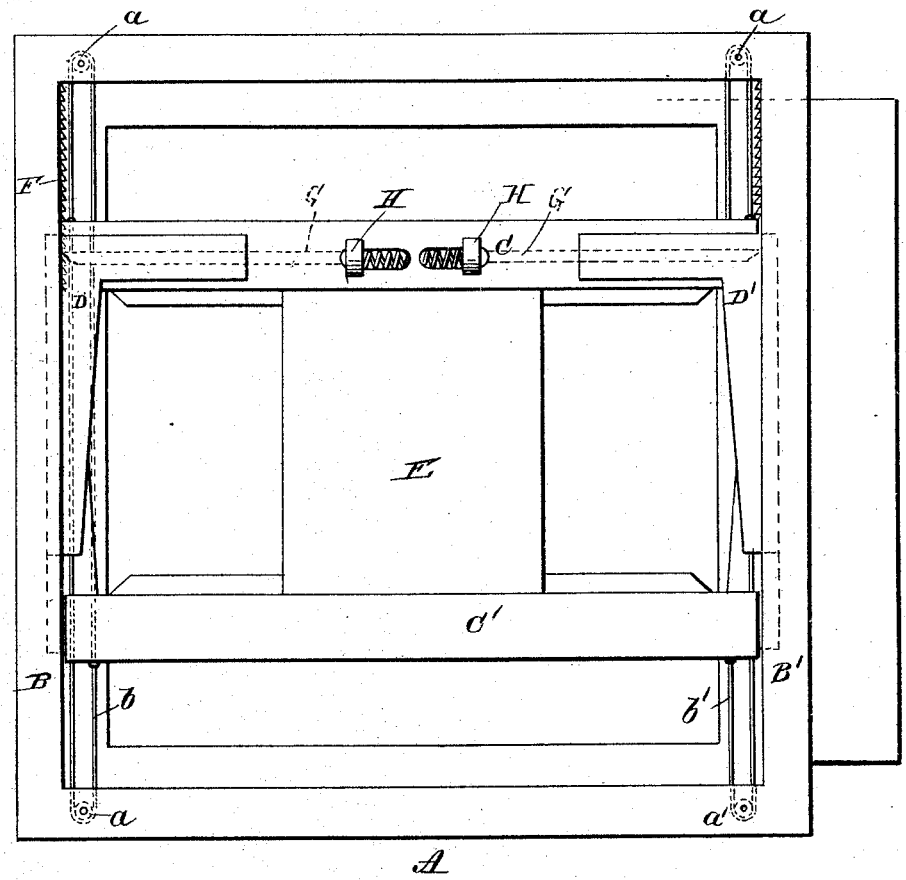
WITNESSES:
INVENTOR:
E. B. Barker
BY Munn & Co
ATTORNEYS.

UNITED STATES PATENT OFFICE.

ERASTUS B. BARKER, OF NEW YORK, N. Y.

ADJUSTABLE PLATE-HOLDER FOR PHOTOGRAPHIC CAMERAS.

SPECIFICATION forming part of Letters Patent No. 356,567, dated January 25, 1887.

Application filed September 15, 1886. Serial No. 213,601. (No model.)

*To all whom it may concern:*

Be it known that I, ERASTUS B. BARKER, of the city, county, and State of New York, have invented a new and Improved Adjustable Plate-Holder for Photographic Cameras, of which the following is a specification, reference being had to the drawing, which is a rear view of the plate-holder with the door removed.

My invention is an improvement on the plate-holder for which Letters Patent No. 346,546, dated August 3, 1886, were granted to Mark E. Hawks, the object being to render the plate-holder more convenient and reliable.

My invention consists in the combination, with the sliding plate-holding bars, of endless bands passing around pulleys and connected with the plate-holding bars, so as to cause the bars to move equally in opposite directions, thus centering the plate in the plate-holder.

It also consists in novel means for holding the bars in the position in which they are adjusted.

The frame A of the holder is provided with grooved end pieces, B B', in which are received the ends of the plate-holding bars C C', each bar being provided at opposite ends with right-angled arms D, which fit in the grooves of the end pieces and insure the parallel movement of the bars. The bars C are rabbeted on their inner edges to receive the plate E.

To the inner face of the end pieces, B B', are secured ratchet-bars F, which are engaged by spring-actuated bolts G, arranged to slide in longitudinal holes in the bar C. Each bolt is provided with a thumb-piece, H, by which it may be withdrawn from engagement with the ratchet-bar.

In the upper and lower sides of the frame A, opposite ends of the bars C C', are journaled pulleys $a\, a'$. An endless belt, $b$, extends around the pulleys $a\, a$, and an endless belt, $b'$, extends around the pulleys $a'\, a'$. The inner strands of the endless belts $b\, b'$ are attached to the ends of the bar C', and the outer strands of these belts are attached to the ends of the bar C. By virtue of their connection with the belts $b\, b'$ in the manner described, when one of the bars C C' is moved the other will be moved in the same manner, but in the opposite direction, so that when the bar C is brought down toward the plate E the bar C' will be raised toward the plate through the same distance. They will thus accurately center the plate E in the plate-holder. Both of the bars C C' are held in the position in which they are placed by the engagement of the spring-actuated bolt G with the ratchet-bar F.

It will be observed that by connecting two bars, C C', with endless belts in the manner described the motion of both bars will always be positive, and the edges of the bars will be securely held in contact with the edges of the plate, and that both the bars and the plate will be held in their proper relation to the frame A, whatever the position of the frame.

It is obvious that in lieu of attaching the ratchet-bar F to the frame A the said bar may be formed integrally with the side of the frame, or holes may be formed in the side of the frame for receiving the end of the fastening-bolt.

In plate-holders of the smaller sizes only one of the bolts G will be required.

I am aware that it is not broadly new in plate-holders to employ belts and pulleys to move the plate holding cross-bars in opposite directions; also, that it is old to employ spring-pressed bolts to retain the said bars in a given position, as both these features are shown in the patent to Hawks, above mentioned. In this patent, however, the ends of each belt are secured to the opposite plate-holding bars— that is, one end of each belt is secured to one bar and the other end of each belt secured to the opposite bar. In my holder I employ endless belts passing over pulleys near the opposite corners of the frame, as described, the ends of one bar being fastened to the inner strand of each endless belt and the ends of the opposite bar secured to the outer strands of the belts. In my holder, also, I employ ratchet-bars (one or more) in connection with the retaining-bolts for locking the plate-holding bars in a given position, while in the Hawks holder the bolts hold the bars in position by frictional contact with the frame.

Having thus fully described my invention, I claim as new and desire to secure by Letters Patent—

1. In a plate-holder for cameras, the combination, with the movable plate-clamping bars, of endless belts connected with the ends of the bars and arranged to insure a similar and simultaneous movement of both bars in opposite directions, substantially as specified.

2. The combination, with the frame A and bars C C′, arranged to slide therein, of the pulleys $a\,a\,a'\,a'$ and the endless belts $b\,b'$, extending around the pulleys and attached to the bars, substantially as described.

3. In an adjustable plate-holder, the combination, with the movable plate-holding bar, of a fastening-bolt and a holding device for receiving the end of the fastening-bolt, substantially as specified.

4. The combination, with the frame A and bars C C′, of one or more ratchet-bars, F, secured to the frame A, and one or more spring-actuated bolts, G, carried by the bar C and arranged to engage the ratchet bar or bars F, substantially as described.

5. As an improved article of manufacture, an adjustable plate-holder formed of the frame A, provided with the pulleys $a\,a\,a'\,a'$, the sliding bars C C′, provided with the arms D, the endless belts $b\,b'$, secured to the sliding bars C C′ and running around the pulleys $a\,a\,a'\,a'$, the ratchet-bar F, secured to the side of the frame A, and the spring-actuated bolt G, carried by the bar C, substantially as described.

ERASTUS B. BARKER.

Witnesses:
C. SEDGWICK,
E. M. CLARK.